Figure 1:
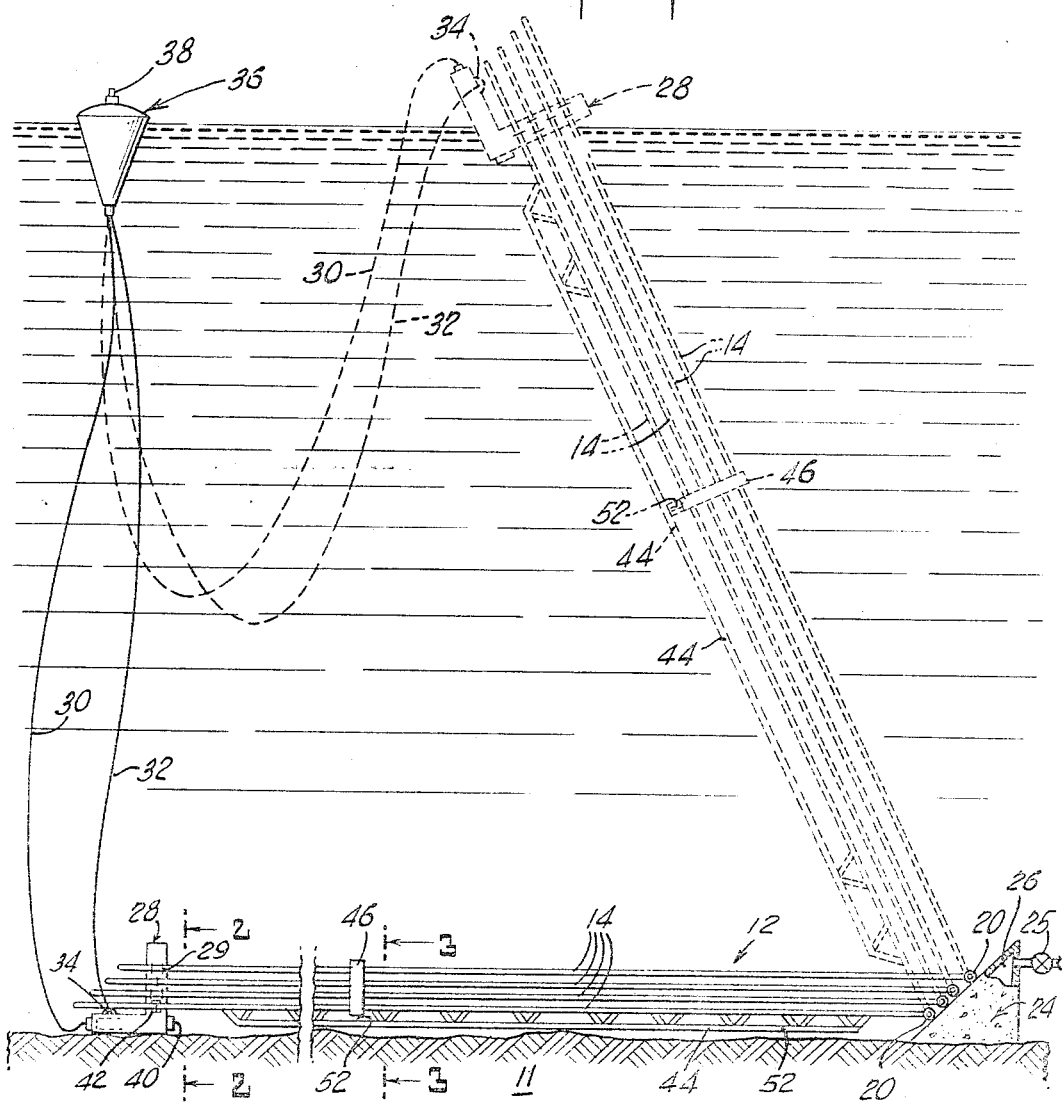

March 21, 1967 W. F. MILLER 3,309,879
SUBMARINE CONDUIT SYSTEM
Filed Dec. 30, 1963 4 Sheets-Sheet 1

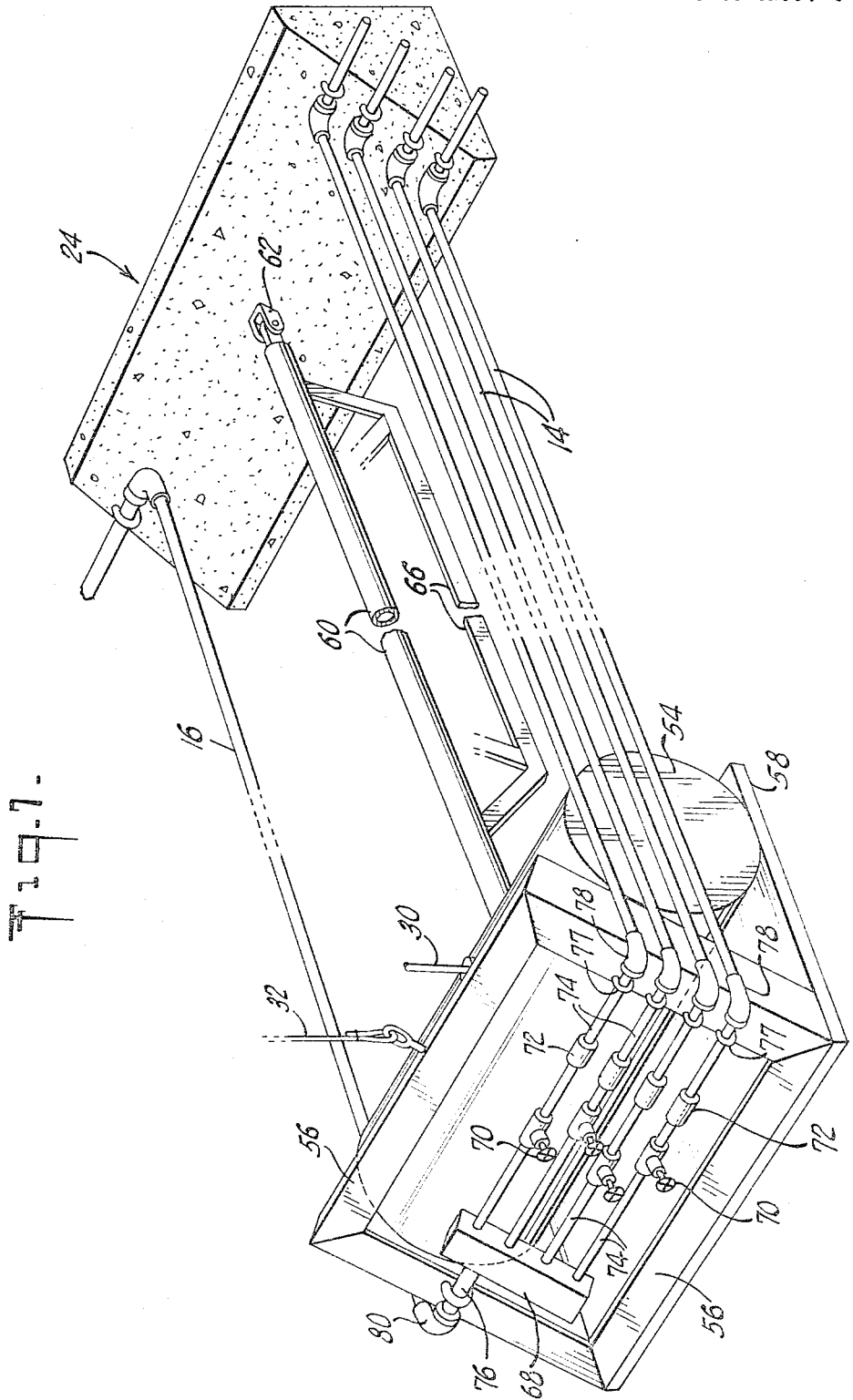

United States Patent Office 3,309,879
Patented Mar. 21, 1967

---

1

3,309,879
SUBMARINE CONDUIT SYSTEM
William F. Miller, Ventura, Calif., assignor to Texaco Inc., New York, N.Y., a corporation of Delaware
Filed Dec. 30, 1963, Ser. No. 334,214
8 Claims. (Cl. 61—72.3)

The present invention relates to submarine piping and conduits such as are encountered in the off-shore production of petroleum and is more particularly concerned with a submarine manifold associated with one or more submarine conduits and which is readily made accessible at the surface of the water for facilitating access to the conduits.

In the production of petroleum at submarine locations, numbers of conduits are necessary not only to conduct the fluids which are produced from the submarine well, but also the various fluids which are necessary in operating the wells. It is, for example, normally necessary to provide means for supplying the well with various well-treating fluids which are well-known in the art and, per se, form no part of the present invention. Moreover, the formation of so-called waxes or other undesired deposits in the product lines renders necessary to provision of lines with which to circulate scrapers, otherwise known as "pigs," or to introduce wax solvents into the system. Also, hydraulic pressure conduits are necessary for the control and actuation of the submarine valves and other actuable equipment. These and other conduits are usually disposed on or near the bottom of the body of water so that they are remote from passing ships or other vessels. Therefore, they are frequently at a depth where it may be inconvenient even for divers, to approach them for maintenance, tie-in, repair, alteration and the like.

The present invention, therefore, contemplates a submarine manifold assembly associated with a submarine conduit system by means of a loop which is mobile with respect to the conduit so that the loop and the manifold station may be brought from a position on the floor of the body of water up to the surface of the water to facilitate access to the conduits. To accomplish this, the loop is joined into the conduit system by either pivotal or flexible connections enabling the manifold to move through the water in a vertical plane. Thus, with a pivotal connection, the entire loop section carrying the manifold system on its outer extremity can pivot upwardly so as to permit direct access to the manifold valves and fittings. This enables direct control of the conduits for conducting various operations, such as pipe line scraping and cleaning, adjustment of flow rate, repairs, conduit arrangement, injection or withdrawal of fluid and similar operations.

Means is also provided for convenient actuation of the system, in the form of a buoyancy member which can be blown with air to bring the manifold station to the surface and conversely is flooded to enable it to sink back into normal ocean-bottom position.

The term manifold or manifold station, as used herein, contemplates the outer end section of the loop which is brought to the surface of the water for access. This normally comprises appropriate pipe fittings, such as couplings, headers, valves, take-off lines, etc., for conducting the various necesary operations and which are not disclosed in detail since they form no specific part of the present invention.

The term "loop," as used herein, contemplates an extension or continuation of the sub-surface conduit system comprising co-extensive lines or runs of pipe which are usually arranged in general parallelism and which normally carry the manifold station on their outer extremities.

2

Figure 2:
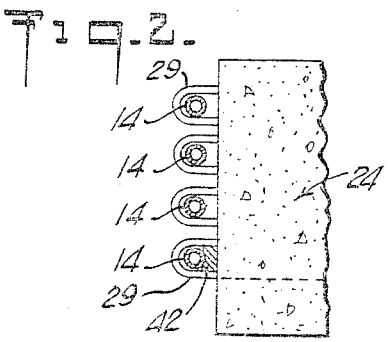
Figure 3:
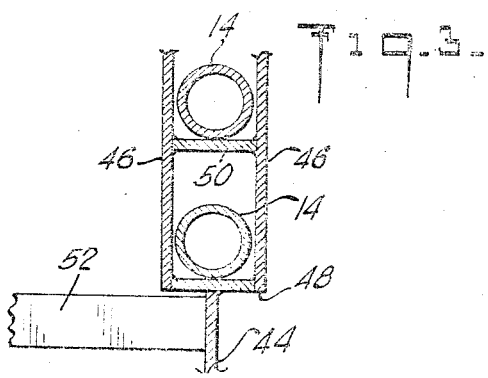
Figure 4:
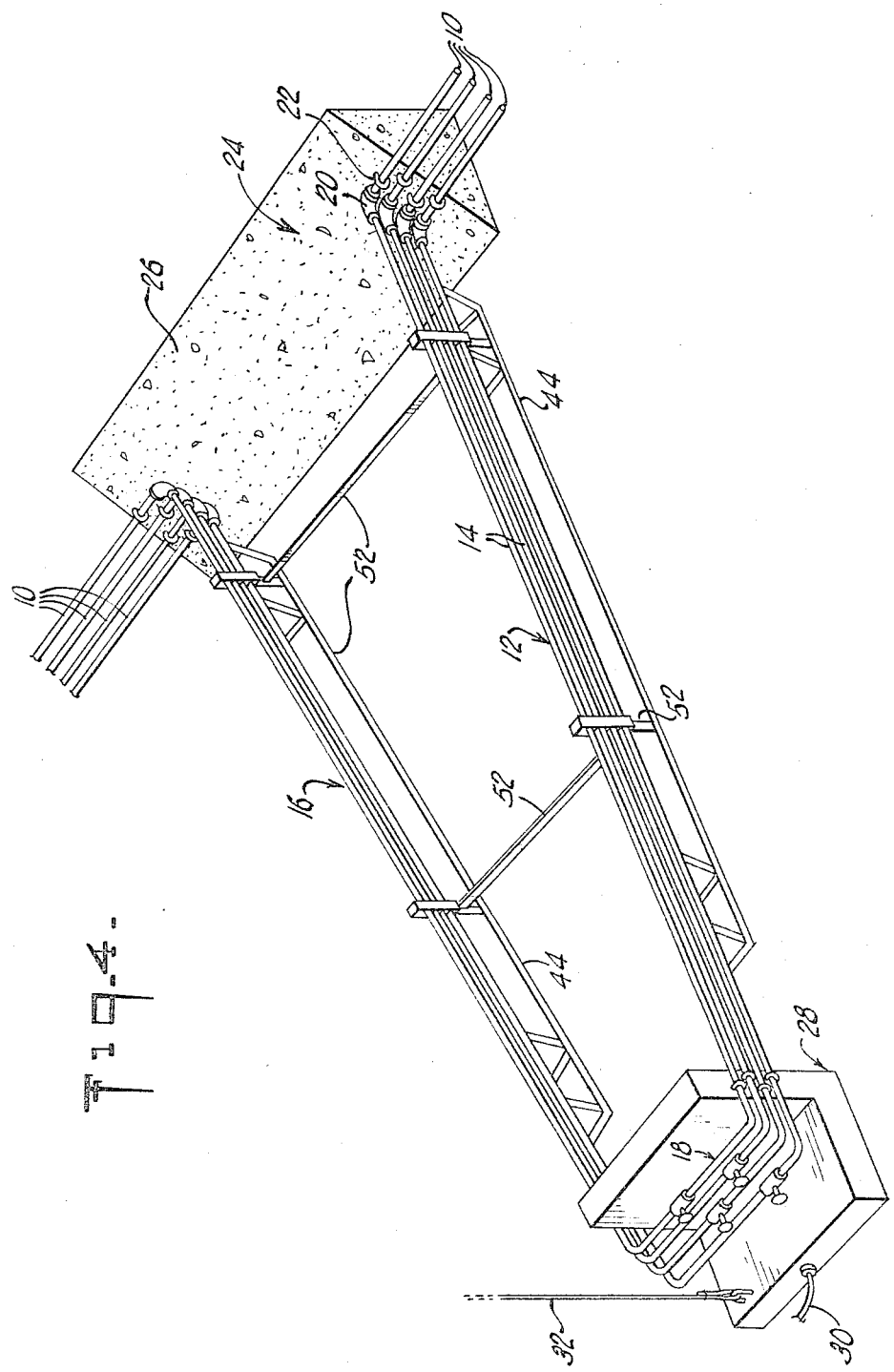
Figure 5:
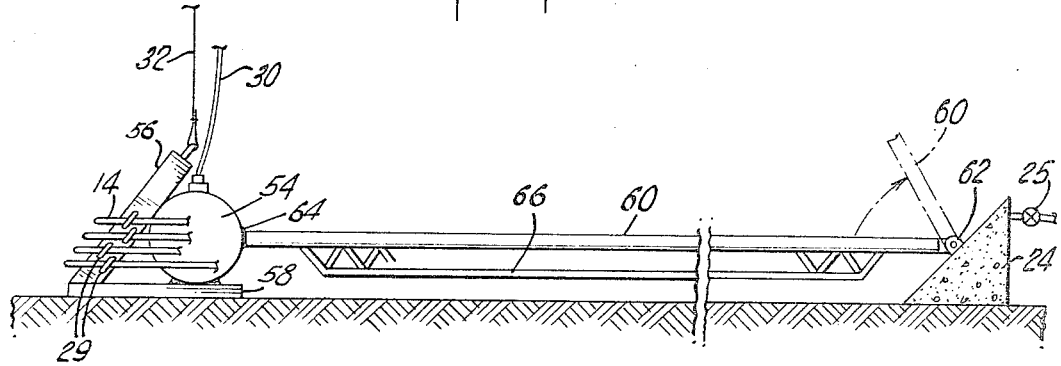
Figure 6:
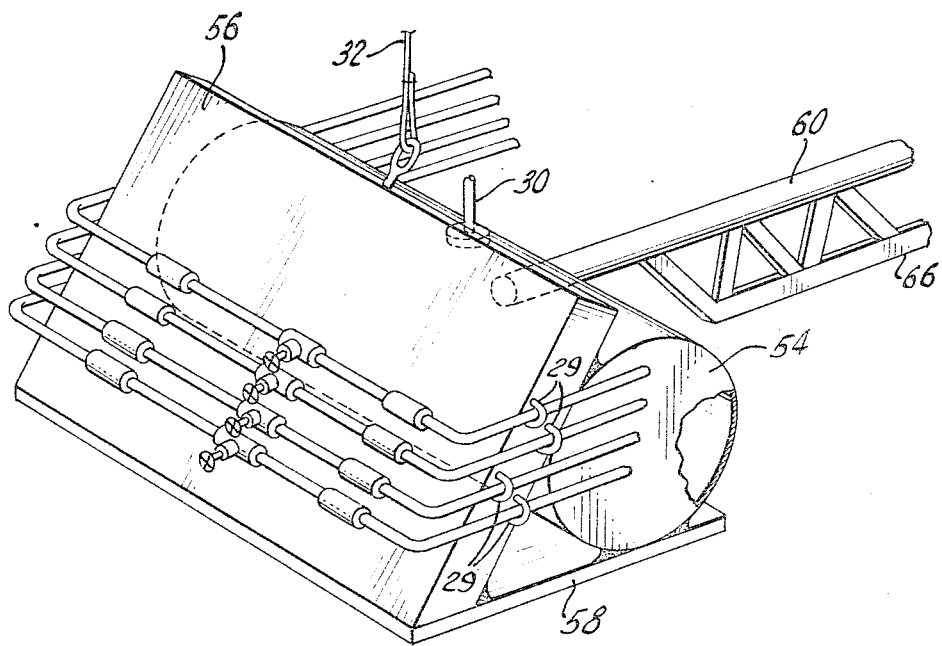

The present invention will be more readily understood by reference to the following specific embodiments which are presented by way of example and shown in the drawings, of which FIG. 1 is an elevation showing a preferred form of submersible manifold; FIGS. 2 and 3 are, respectively, sectional details taken on the lines 2—2 and 3—3 of FIG. 1; FIG. 4 is a perspective view showing the submersible manifold in somewhat greater detail; FIG. 5 is a partial elevation of a modified form of submersible manifold; FIG. 6 is a detailed perspective of the manifold station of FIG. 5; and FIG. 7 is a perspective view of a yet further modified form of the present device.

Referring to FIGS. 1 and 4, the numeral 10 represents four sub-surface pipes or conduits which lie on and extend along the ocean bottom 11 for conducting various fluids. Embodied within each of these conduits is a laterally extending loop 12 comprising sides legs 14 and 16 joined by a lateral manifold section 18 which may be provided with couplings, headers, connectors, valves or any other equiment or combination of equipment necessary to provide access to the conduits. Each of the loops is pivotally interposed in the respective conduit 10 by a pair of axially aligned swing joints 20. The swing joint, as is known, comprises an L pivotal about the longitudinal axis of the pipe 10 and suitably packed to prevent leakage of fluid. To permit this, the extremities of pipes 10 just ahead of the swing joints 20 are clamped or otherwise fastened by U bolts 22 to a suitable base or anchor 24.

While the anchor may take a number of forms, it preferably comprises a hollow concrete block of triangular cross-section which can be floated to location on the surface of the water and then permitted to settle by simply flooding it with water. Flooding is accomplished by opening a suitable vent 25 which permits water to enter through an opening in the base of the anchor, not shown. Obviously, the anchor can be raised and salvaged by blowing with compressed air through vent 25.

For reasons which are hereinafter developed more in detail, the upper surface 26 of the anchor block is preferably located in a plane which is inclined substantially with respect to the horizontal as, for example, at an angle of 45°, as shown in FIGS. 1 and 4.

A buoyancy tank or float 28 is provided adjacent to the extremity of the loop at the manifold station for the purpose of lifting the loop about the pivotal connections 20. In the present embodiment, the buoyancy chamber 28 comprises an L shaped vessel or tank preferably made of sheet metal. Access to the buoyancy chamber is obtained by a compressed air line 30 which may be supplemented by a wire line or cable 32 attached to the chamber as at 34. Both cable 32 and air line 30 extend upwardly to a surface buoy 36 where the air line continues upwardly through the buoy to a coupling or connector 38 at the top thereof. Inasmuch as the tank is also provided with a normally open vent 40, it may therefore be blown simply by applying a source of compressed air through the coupling or connector 38. Thus, from a compressor line or a tank of compressed air or gas on a ship or barge at the surface, buoyancy is applied to the extremity of the loop to enable it to rise to the surface at the dotted line position of FIG. 1.

Due to the inclined upper surface 26 of the anchor 24, the swing joints are so arranged that the side lines 14 and 16 of the loop remain in suitably spaced arrangement as they swing upwardly. Moreover, inasmuch as the side members of the loops tend to shift axially relative to one another and to the upstanding leg of the L shaped bouyancy tank 28 as they swing upwardly, connection of these lines to the tank is normally effected by suitable slip joint connections in the form preferably of U bolts 29 which loosely embrace the pipes, as shown in FIG. 2, and enable them to move in an axial direction relatively to the fasteners. However, to prevent the buoyancy tank from slipping downwardly along the side runs or legs 14 and 16 of the loops, as it is flooded, the lowermost of these legs are preferably, securely fastened to tank 28 by firmly gripping them between the U bolt 29 and a block 42. Welding or any other suitable means may, however, be employed for this purpose.

From the foregoing, it will be apparent that to raise the manifold, compressed air is simply applied through line 30 to blow the tank, whereupon the ends of the loops pivot upwardly about swing joints 20 to the dotted line position shown at FIG. 1. Additional lifting force may be applied via cable 32 to break the buoyancy tank loose from bottom suction.

To lower the assembly to ocean bottom position, line 30 is vented at 38 to permit tank 28 to flood. It is particularly important to note that the bottom of tank 28, as it approaches normal position on the ocean floor, presents a broad, flat horizontal surface which acts as a sweep, substantially restricting the speed of descent and, thus, providing a desirable braking action against excessive impact with the ocean bottom.

Because the present invention is effective in waters of very substantial depth beyond the convenient capabilities of a diver, it is frequently advisable to brace the side members of 14 and 16 of the loop against excessive flexure or sag. One convenient way of accomplishing this is to provide the pipe runs 14 and 16 with an elongated truss support which may take the form of a typical Truscon type joist 44 as shown (see FIGS. 1 and 4). This may be provided as a unit and welded directly to the lower side of the lowermost pipe members 14 and 16. The upper runs of pipes 14 and 16 may also be protected against sag by a ladder-type arrangement, shown particularly in FIG. 3, which includes side plates or risers 46 welded to the flanges of the truss member 44 as at 48 and provided with internal spacers 50.

In addition, where necessary on relatively elongated and heavy loops, the invention contemplates the use of lateral bracing members 52 which can be welded to a truss member as shown to provide lateral stability. These bracing members may also be placed diagonally to form a lateral truss construction.

The modifications shown more or less diagramatically in FIGS. 5 and 6 employ a cylindrical buoyancy tank or float drum 54 to which is attached a manifold supporting frame or platform 56. Moreover, the bottom of the buoyancy section again comprises a flat plate 58 of substantial horizontal area to apply a substantial braking effect against the sinking or falling tendency of the unit as it drops to the bottom. As before, the tank 54 connects with the air line 30 and wire line or cable 32.

In the present embodiment, structural strength and rigidity is realized by means of a spar or boom 60 pivoted to the anchor 24 as at 62, the outer extremity being welded to the drum 54 as at 64. Likewise, a suitable truss 66 may be incorporated in the boom 60.

In the yet further modification shown in FIG. 7, the loop structure comprises a series of side runs 14 which at the manifold station join through a header 68 with a single line 16. Valves 70 and couplings 72 afford control of the lines of the conduits and access to the interior thereof.

It is important to observe that in the present embodiment manifold lines 74 and 76 are clamped to the frame member 56 by U bolts 77. This is permitted by virtue of the fact that these pipes connect with the side runs or conduits 14 and 16 by swing joints 78 and 80.

From the foregoing, it will be apparent that the present invention provides simple and convenient access to ocean bottom fluid conducting equipment for service, maintenance, repair, and reconstruction as well as for injecting and withdrawing fluid, and for conducting the various services which are necessary in connection with sub-surface wells. The anchor 24 may be floated to location and sunk after attachment thereof of the complete equipment, including the main lines of the conduits involved. Thereafter, to work on the unit, it is only necessary to attach a source of compressed air at the coupling 38 in order to cause the manifold station to rise to the surface where it is completely accessible from any convenient ship or barge. With completion of the work, the assembly is returned to its sea bottom position by simply venting the air pressure line 30 and permitting the tanks to flood. Undue impact with the bottom is prevented by the fluid resistance offered by the extensive flat horizontal bottom surface of the buoyancy member. In place of the swing joints, flexible connectors may be used.

Various other modifications of the invention, coming within the scope of the following claims, will be apparent from the foregoing description which is given by way of example only.

I claim:

1. In a submarine conduit system located below the surface of a body of water, means for enabling surface access to said system for maintenance, control and similar operations, comprising at least one pipe loop, said pipe loop comprising an elongated U-shaped extension of the conduit system which normally rests in a lower position in a generally horizontal plane below the surface of said body of water, mobile connecting means connecting the ends of said loop with said conduit system permtiting the pipe loop to swing upwardly in a vertical plane about the axes of said conduits to an upper position where the outer extremity of the loop extends to the vicinity of the surface of said body of water, pipe manifold means connected at the outer extremity of said loop, a buoyancy chamber in the vicinity of said manifold for lifting said manifold to said upper position, and means for flooding said chamber to enable said manifold to settle to said lower position.

2. The combination as called for in claim 1 wherein a plurality of pipe loops are connected with said conduit system and said manifold means.

3. The combination as called for in claim 1 wherein the mobile connections comprise swing joints arranged to permit the pipe loop to pivot thereabout in a vertical plane.

4. The combination as called for in claim 2 wherein the pipe loops comprise a plurality of generally parallel side runs of substantial length supported by a truss beam construction.

5. In a submarine conduit system located adjacent to the bottom of a body of water, means for enabling surface access to said system for maintenance, control and similar operations thereon, comprising a plurality of pipe loops extending from said conduit system and normally disposed in a substantially horizontal plane at the bottom of said body of water, said loops being displaced vertically with respect to one another, an anchor base located on the body of water bottom having a surface thereof inclined from the vertical and sloping downward in the direction of said loops, a plurality of conduits of said system being attached to said base, swing joint means connecting the ends of each of said loops to a respective conduit, said swing joints being arranged with their axis of rotation located vertically from one another along said inclined surface of said anchor base, whereby said loops are pivotal about said swing joints in a vertical plane to and from said parallel bottom position and a position where the outer extremities of said loops are in the vicinity of said water surface, manifold means located at the extremities of said loops for association and control of said conduit system, bouyancy means adjacent to said manifold for lifting said manifold to the surface of the water, said loops being slidably attached lengthwise to said bouyancy means to allow lengthwise displacement of said loops with respect to one another during pivoting about said swing joints, and means for flooding said bouyancy means to enable the manifold to settle to the ocean bottom position.

6. In a submarine conduit system according to claim 5, wherein said pipe loops each comprise generally parallel side runs of pipe of substantial length, a truss girder associated with each of said side runs of pipe arranged parallel thereto and supporting means extending vertically from each girder to support each of said long runs of pipe against sag.

7. In a submarine conduit system as defined in claim 5 means for cushioning the downward movement of the manifold as it settles in ocean bottom position comprising a flat sweep member of substantial area connected to the lower portion of said manifold and disposed in a substantially horizontal plane as the manifold approaches ocean bottom position.

8. The combination as called for in claim 5 wherein a flexible conduit extends from said buoyancy chamber to the surface of the water for supplying gas under pressure to said buoyancy chamber and wherein said chamber is provided with means to discharge flooding liquid upon the application of such pressure.

References Cited by the Examiner
UNITED STATES PATENTS 2,955,626 10/1960 Hartley _____ 141—279
3,236,266 2/1966 Bily _____ 141—1

CHARLES E. O'CONNELL, *Primary Examiner.*

JACOB SHAPIRO, *Examiner.*